United States Patent
Yamana et al.

[11] Patent Number: 5,587,110
[45] Date of Patent: Dec. 24, 1996

[54] COMPOSITION BEING CAPABLE OF IMPARTING CONDUCTIVITY AND NON-TACKIFYING PROPERTY, PAINT USING THE COMPOSITION, AND ROLLER

[75] Inventors: Masayuki Yamana; Tomohiro Isogai, both of Settsu, Japan

[73] Assignee: Daikin Industries, Ltd., Osaka, Japan

[21] Appl. No.: 481,366

[22] PCT Filed: Oct. 3, 1994

[86] PCT No.: PCT/JP94/01655

§ 371 Date: Jun. 30, 1995

§ 102(e) Date: Jun. 30, 1995

[87] PCT Pub. No.: WO95/09887

PCT Pub. Date: Apr. 13, 1995

[30] Foreign Application Priority Data

Oct. 5, 1993 [JP] Japan ................................. 5-249593
Apr. 28, 1994 [JP] Japan ................................. 6-091993

[51] Int. Cl.$^6$ ............................. H01B 1/00; H01B 1/24
[52] U.S. Cl. ........................... 252/511; 252/502; 423/449.4; 423/489; 428/922; 428/357; 428/378
[58] Field of Search ............................. 252/502, 511; 423/449.4, 489; 428/922, 357, 378

[56] References Cited

U.S. PATENT DOCUMENTS

| | | | |
|---|---|---|---|
| 4,036,786 | 7/1977 | Tiedemann | 252/511 |
| 4,482,476 | 11/1984 | Yoshimura et al. | 252/511 |
| 4,515,709 | 5/1985 | Watanabe et al. | 252/509 |
| 4,634,546 | 1/1987 | Kalnin et al. | 252/506 |
| 4,645,620 | 2/1987 | Palchan et al. | 252/502 |
| 4,795,624 | 1/1989 | Nalewajek | 423/439 |
| 5,194,360 | 3/1993 | Ohmura et al. | 427/195 |
| 5,254,409 | 10/1993 | Yagi et al. | 252/502 |

FOREIGN PATENT DOCUMENTS

| | | |
|---|---|---|
| 409512 | 1/1991 | European Pat. Off. . |
| 58-24174 | 2/1983 | Japan . |
| 63-44224 | 2/1988 | Japan . |

OTHER PUBLICATIONS

Interational Search Report for International Appln. No. PCT/JP94/01655.

*Primary Examiner*—Paul Lieberman
*Assistant Examiner*—M. Kopec
*Attorney, Agent, or Firm*—Varndell Legal Group

[57] ABSTRACT

A composition which is capable of imparting electrical conductivity and non-tackifying property, comprising (A) a carbon fluoride in which a ratio F/C of fluorine atom to carbon atom is more than 0.5 and less than 1.0 and (B) at least one selected from the group consisting of a thermoplastic resin, a thermosetting resin and a rubber, a paint composition containing the same, and a semi-electrically conductive roller for electrostatic copying machine having an electrically resistive layer formed from the composition.

20 Claims, 2 Drawing Sheets

COMPOSITION BEING CAPABLE OF IMPARTING CONDUCTIVITY AND NON-TACKIFYING PROPERTY, PAINT USING THE COMPOSITION, AND ROLLER

TECHNICAL FIELD

The present invention relates to a composition containing a carbon fluoride and capable of imparting electric conductivity and non-tackifying property, a paint composition using the above-mentioned composition, and a roller having an electrically resistive layer being formed using the composition.

BACKGROUND ART

Fluorine-containing rubbers have excellent properties such as heat resistance, oil resistance, solvent resistance and chemical resistance as compared with rubbers for general uses, and are widely used as industrial materials in the field where these properties are required.

The fluorine-containing rubbers have been usually used by vulcanizing and molding a vulcanizable fluorine-containing rubber composition, which is prepared by blending a vulcanizing agent, a vulcanization accelerator, an acid receiving agent, a vulcanizing auxiliary, an inorganic filler and the like.

As the above-mentioned mixing components, examples of the vulcanizing agent are a polyamine or its salt, an organic peroxide, a polyhydroxyl compound and the like. As the vulcanization accelerator, examples are an organic tertiary or quaternary compound containing nitrogen or phosphorus and the like, and as the acid receiving agent, examples are a bivalent metal oxide or a hydroxide and the like. As the vulcanizing auxiliary, examples can be mentioned a compound having a plurality of vinyl groups or aryl groups. In addition thereto, there are admixed inorganic fillers, if necessary, such as carbon black, silica, clay, diatom earth, talc, calcium carbonate and the like for the purposes to improve and enhance mechanical properties of mainly the fluorine-containing rubbers.

Further, in order to enhance abrasion resistance of the vulcanized rubber, there are admixed, as a solid lubricant, molybdenum disulfide and graphite or a low molecular weight polytetrafluoroethylene and/or a carbon fluoride as disclosed in JP-B-40168/1981.

Also in order to obtain a high level chemical resistance and elusion resistance which are required in a semiconductor production process and the like, there is a case where a carbon fluoride is admixed as disclosed in JP-A-169845/1987.

These fluorine-containing rubbers are electrically insulative materials having a volume specific resistance exceeding $10^{12}$ Ωcm. Therefore there was a problem that the molded fluorine-containing rubbers are apt to charge with static electricity thereon, and are susceptible to contamination due to dusts. Thus for the use in the semiconductor production process, it was very difficult to handle those rubbers because of dust generation. Also in a pressure roller, paper feed roller and the like, those rubbers cause troubles that a paper sticks to the roller due to static electricity and toner powders stick or scatter. Also in the use for fuel tubes of automobiles, a spark generated by static electricity becomes a cause for a fire and it is very dangerous.

Therefore it is attempted to admix an electrically conductive material in a fluorine-containing rubber composition. As the electrically conductive material, examples are a carbon material such as carbon black, graphite powder or carbon fiber, and a metal powder.

However if the carbon black is admixed in an amount sufficient for obtaining electric conductivity, there occurs a problem that hardness of the rubber is increased because of a structure of carbon black. The mixing of powder such as graphite powder and carbon fiber having anisotropic shape causes a problem that roughness of the rubber surface is increased, and the admixing of metal powder causes a problem that an excellent chemical resistance inherent to the fluorine-containing rubber is impaired.

Also the desired electric conductivity varies depending on uses. In the above-mentioned various uses, the lower the volume specific resistance is, the more preferable if it is not more than $10^8$ Ωcm. The composition is selected within such a range as not sacrificing other properties of the fluorine-containing rubber composition.

For example, in a fixing roller of an electrostatic copying machine, the lower the volume specific resistance is, the more preferable if it is not more than $10^8$ Ωcm as mentioned above in order to prevent electostatic offset (a phenomenon wherein the roller is electrically charged due to a friction to paper, and an un-fixed toner image is sucked or repels due to this static electricity, thus disturbing the fixed image). At the same time, an excellent non-tackifying property is required to prevent hot offset (a phenomenon wherein the fixed image is disturbed because the toner heated and molten by the roller sticks to the roller).

For this purpose, attempts to add the carbon materials have been hitherto made, but the addition of the carbon materials in an amount enabling sufficient conductivity to be obtained causes a problem that non-tackifying property lowers. Thus a composition satisfying both electric conductivity and non-tackifying property is desired.

However a specific range of electric conductivity is desired in so-called semi-electrically conductive rollers of the electrostatic copying machine such as a charging roller, transferring roller and developing roller. Concretely in the charging roller, the volume specific resistance is required to be controlled to be in the range of $10^8$ to $10^{12}$ Ωcm. It is not allowed that even a part of the roller deviates from this range. That is to say, if it is not less than $10^{12}$ Ωcm, a necessary electric charge is not given to a photosensitive drum, and if it is not more than $10^8$ Ωcm, the photosensitive drum and high voltage power source are damaged by an over-current.

In order to use a fluorine-containing composition wherein usual electrically conductive substances are mixed, for these applications, there is a problem that accurate control of the mixing amounts and sufficient kneading are required. This is because it is difficult to control the volume specific resistance to be in a narrow range of $10^8$ to $10^{12}$ Ωcm since the resistance lowers sharply when the usual electrically conductive substance added step by step exceeds a certain amount. Therefore there is desired the fluorine-containing composition having electric conductivity and non-tackifying property which enables changes in mechanical properties such as increase in hardness and a surface roughness and non-tackifying property to be minimum without impairing inherent excellent properties of the fluorine-containing rubbers such as chemical resistance.

On the contrary, fluorine-containing rubber paints are widely used as industrial materials to be coated or impregnated on various substrates, for example, metals, plastics, rubbers, glasses, ceramics, fabrics, non-woven fabrics, fibers, porcelains and others because of excellent heat resistance, weatherability, oil resistance, solvent resistance and chemical resistance which fluorine-containing rubbers have.

Usual fluorine-containing rubber paints are those prepared by mixing an aminosilane compound as a coupling agent in an aqueous dispersion of fluorine-containing rubber as mentioned in JP-B-53671/1983, and if necessary, various additives are added thereto.

For instance, in JP-B-35432/1987, it was found out that by mixing a fluorine-containing resin, non-tackifying property and lubricity could be given to a surface of a coating without impairing adhesivity to a substrate, and further in addition, the coating having an excellent compression recovering property.

Also in JP-B-38393/1987, it was found out that electric conductivity could be imparted on an obtained film without impairing any features of fluorine-containing rubber paints by mixing an electrically conductive substance selected from the group consisting of a carbon black, a graphite, a metal and an antistatic agent.

However as mentioned hereinabove, it is required that fluorine-containing rubber paints have a particular range of volume specific resistance as the paints for the production of semi-electrically conductive rollers for electrostatic copying machine. Therefore when it is intended to control electric conductivity by mixing carbon materials such as carbon black as the electrically conductive substance in the fluorine-containing rubber paints, there is a problem that accurate control of the mixing amount and homogeneous dispersion are required. That is to say, this is because when usual electrically conductive substances added step by step exceed a certain amount, the resistance changes sharply. Among various electrically conductive substances, the carbon black has a feature that the deterioration of non-tackifying property, chemical resistance and the like of fluorine-containing rubbers can be minimized. However the carbon black being excellent in electric conductivity has a progressed structure, and is in difficult to disperse fluorine-containing rubber paints and larger in increase in viscosity. Also there is a marked tendency that the fluorine-containing rubber becomes harder and the surface roughness is increased.

When the hardness increases, in order to obtain an effective contact to the drum and paper, it is necessary to press by a strong force, and as a result, there occurs disturbance of the drum and image. When the surface roughness is increased, there occurs irregular contact to the drum and paper and disturbance of the image.

Therefore there is required fluorine-containing rubber paints having electric conductivity and non-tackifying property which can minimize changes in the surface roughness, non-tackifying property and mechanical property such as hardness without causing a sharp change in the resistance by a change in the mixing amount and impairing excellent properties inherent to fluorine-containing rubber such as chemical resistance.

As mentioned above, an electrically resistive layer having electric conductivity and non-tackifying property is strongly demanded for semi-electrically conductive rollers for electrostatic copying machine. This matter is stated further concretely.

A corona discharge method and contact charge method have been adopted in a charging or transferring process of an electrostatic copying machine, laser printer and facsimile which utilize an electro-photographic method as one of image forming methods. First, in the corona discharge method, a machine structure is simple, but there are disadvantages that there is a generation of ozone, which not only causes an adverse effect on environment but also shorten a life of an organic photoreceptor. On the contrary, in the contact charge method, because there is no ozone generation and in addition, energy loss is small, a high pressure power source can be small-sized. In addition, since power consumption is decreased, this method is suitable for making a size of a whole machine smaller. The contact charge method in the charging process is one for electrically charging a surface of a photosensitive drum by bringing the semi-electrically conductive roller into contact with a surface of a photosensitive drum and rotating it. This method is proposed in, for instance, JP-A-843/1975, JU-A-88645/1983, JP-A-194061/1983, JP-A-142569/1989 and JP-A-311972/1992.

An electrostatic copying machine using this contact charge method has a structure as stated, for instace, in JP-A-311972/1992. The structure thereof is, for example, one as shown in FIG. 1. A photosensitive drum 1 usually comprises an organic photoreceptor, and there may be used selenium, CdS, amorphous silicon and the like. A charging roller 2 is disposed being brought into contact with the above-mentioned photosensitive drum 1. A developing device 3, a transferring roller 5 and a toner cleaner 7 are arranged in the clockwise direction, certering around the charging roller 2. Further a fixing roller 6 for fixing of a transferred paper 4 fed out from the transferring roller 5 is disposed in the vicinity of the photosensitive drum 1 between the transferring roller 5 and the toner cleaner 7.

The image forming process of the electrostatic method using the semi-electrically conductive roller is briefly explained hereinbelow.

The charging roller 2 the comprising the semi-electrically conductive roller having an elasticity is rotated on the outer circumferential surface of the photoconductive drum 1 (for instance, linear speed 60 mm/sec) rotating in the direction of an arrow, by the photosensitive drum 1, being partly elastically deformed. The outer surface of the photosensitive drum 1 is electrically charged by bringing it into contact with this charging roller 2. On the surface of the thus charged photosensitive drum 1 is formed an electrostatic latent image corresponding to an original image by means of an exposing mechanism portion 8, and the latent image is made into a visible image by a developing device 3. Then an electric charge reverse to the visible image of toner particles which is formed on the photosensitive drum 1 is applied to a transfer paper through the transferring roller 5 to transfer the visible image of the toner particles onto the transfer paper 4. The visible image of the toner particles electrostatically sticking to the transfer paper 4 is fused and deposited on the transfer paper 4 by the heated fixing roller 6 to give a fixed image.

In this case, 85 to 95% of the toner sticking onto the surface of the above-mentioned photosensitive drum 1 by means of the transferring roller 5 is transferred on the drum but the remaining toner after this transfer is nearly completely removed by means of a toner cleaner 7, then is wholly subjected to an emission of light by an eraser 9, and initiated to make preparation for the subsequent charging.

As mentioned above, for the electrostatic copying machine and the like, there are used many semi-electrically conductive rollers such as the charging roller, developing roller, transferring roller and fixing roller. As shown in FIG.

2, such a semi-electrically conductive roller to be used is such that a metallic core roll and an electrically conductive elastic layer 11 on the outer circumference thereof are formed and an electrically resistive layer 12 is formed over this electrically conductive elastic layer 11.

As the materials for the electrically conductive elastic layer, there are used ones having a volume specific resistance of not more than $10^5$ Ωcm, preferably not more than $10^3$ Ωcm and a rubber hardness (JIS A) of 20 to 50 degrees, preferably 25 to 40 degrees. This layer comprises generally a composition prepared by mixing an electrically conductive powder (carbon black, metal powder and the like) into a synthetic rubber such as a silicone rubber, ethylene propylene rubber, nitrile rubber and urethane rubber.

Also as the materials for the electrically resistive layer, those having a volume specific resistance of $10^6$ to $10^{12}$ Ωcm, preferably $10^8$ to $10^{12}$ Ωcm are used. This resistive layer generally comprises a polar rubber such as an epichlorohydrin rubber, nitrile rubber, acrylic rubber, urethane rubber and chloroprene rubber, or further a composition prepared by mixing a low resistive substance such as an electrically conductive powder (carbon black, metal powder and the like ), electrically conductive fiber (carbon fiber and the like), fluorine-containing surfactant and ester type plasticizer into a highly resistive synthetic rubber such as a silicone rubber, ethylene propylene rubber, styrenebutadiene rubber, or a fluorine-containing polymer such as a fluorine-containing resin and fluorine-containing rubber.

However in the semi-electrically conductive roller having the electrically resistive layer as mentioned above, when the resistive layer comprises a polar rubber such as a epichlorohydrine rubber, nitrile rubber and acrylic rubber, since a releasing property against a toner is generally poor, there is a problem that a small amount of the toner remaining on the surface of the photoreceptor sticks to the roller surface and is solidified (This phenomenon is called a toner filming.) when this roller is used as a charging roller and a transferring roller. For instance, in case where the toner is solidified on the charging roller, a roller charger is deprived of its function, and it becomes impossible for the portion of the roller, where the toner sticks and is solidified, to electrically charge the photoreceptor. Also when used as the developing roller, there occurs more remarkably the sticking of the toner to the roller surface, which becomes a cause for an irregular image and is not preferable.

Also in case where the materials of the electrically resistive layer are ones prepared by dispersing a carbon black or the like in a synthetic rubber or a fluorine-containing polymer, there is a disadvantage that an electric breakdown is liable to occur under high voltage. For instance, in case of the charging roller, if there are pin holes on the surface of the photoreceptor, there is formed an electrically conductive pass leading to a back plate of the photoreceptor, thus excess current flows from the charging roller and a voltage applied to the charging roller drops. From a point of an image, in a negative-positive phenomenon, there is a problem that a black line appears in the horizontal direction of a contacting portion between the photoreceptor and the charging roller.

This occurs due to the reason mentioned hereinbelow. As mentioned above, when adding the carbon black to the insulative substrate, the volume specific resistance of the obtained composite material sharply changes from not less than $10^{12}$ Ωcm down to not more than $10^6$ Ωcm when the carbon black to be added exceeds a certain amount. Therefore if the dispersion of carbon black is insufficient, there occurs locally a difference in an adding amount and there is a portion where the volume specific resistance is not more than $10^6$ Ωcm. In this portion there occurs an electric breakdown arising from an insufficient dispersion of the carbon black.

Also when a fluorine-containing surfactant and an ester type plasticizer are added to the materials of the electrically resistive layer, these additives bleed out with the lapse of time. Thus not only an initial characteristic of the roller cannot be maintained for a long period of time, but also the surface of the photoreceptor is stained and a life of a whole system is also shortened.

An object of the present invention is to provide a composition and paint composition being capable of imparting electric conductivity and non-tackifying property to a resin or a rubber.

Also an object of the present invention is to provide a semi-electrically conductive roller being excellent in releasing property (non-tackifying property) against a toner and having an electrically resistive layer, which comprises materials containing neither an electrically conductive powder such as carbon black being liable to cause an electric breakdown under high voltage nor a low resistive substance such as a fluorine-containing surfactant and ester type plasticizer being liable to ooze out from the inside of the roller with the lapse of time and stain the photoreceptor and the like.

DISCLOSURE OF THE INVENTION

This invention relates to a composition being capable of imparting electric conductivity and non-tackifying property and comprising (A) a carbon fluoride having a fluorine atom to carbon atom ratio F/C of more than 0.5 and less than 1.0 and (B) at least one kind selected from the group consisting of a thermoplastic resin, a thermosetting resin and a rubber.

BEST MODE FOR CARRYING OUT THE INVENTION

Figure 1:
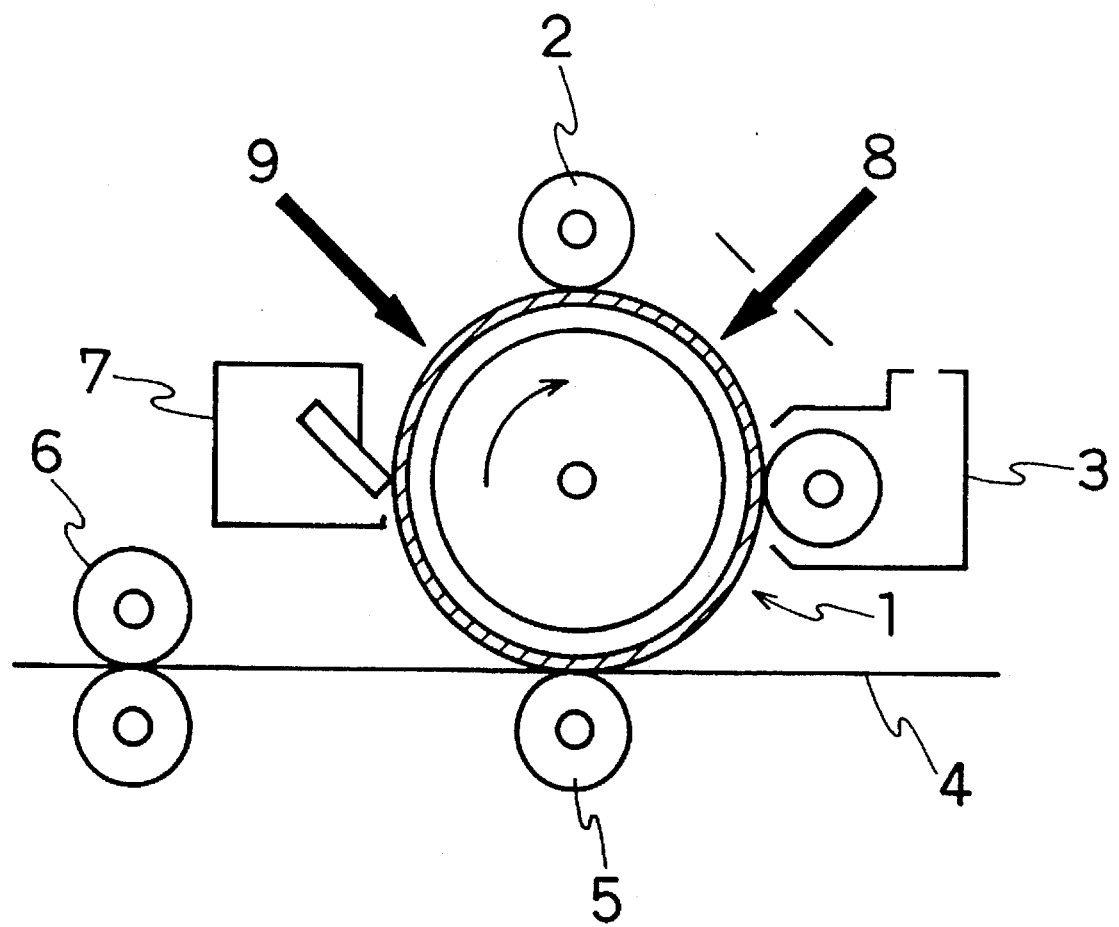
FIG. 1 is an illustrative view of an electrostatic copying machine wherein the semi-electrically conductive roller of the present invention is used as a charging roller.

It is preferable in the component (A) comprising such a composition that the F/C is more than 0.5 and less than 1.0, preferably not more than 0.95, particularly not more than 0.9. It is preferable that the carbon fluoride of the component (A) is one obtained by fluorinating the carbon black, particularly electrically conductive carbon black with a fluorine gas. The fluorinating temperature is preferably 200° to 600° C.

Also in the component (B), as the thermoplastic resin, a fluorine-containing resin, polyamide or polyamideimide is preferable, and as the thermosetting resin, a silicone resin is preferable.

As the rubber, a silicone rubber or fluorine-containing rubber, or a styrene-butadiene rubber, polyurethane rubber, nitrile rubber, chloroprene rubber or EPDM is preferable.

The mixing ratio (A)/(B) of the component (A) to the component (B) is preferably 1/99 to 30/70 in a weight ratio.

The present invention further relates to a paint composition comprising these compositions and a liquid carrier.

The present invention still further relates to an electrically conductive non-tackifying roller comprising an electrically conductive elastic layer having a volume specific resistance of not more than $10^5$ Ωcm and an electrically resistive layer having a volume specific resistance ranging from $10^6$ to $10^{12}$ Ωcm, both of which are formed on an electrically conductive supporting body at least in that order, and the resistive layer comprises the above-mentioned compositions.

Such a roller is suitable for the semi-electrically conductive rollers such as the charging roller, transferring roller and developing roller for the electrostatic copying machine, and particularly a roller wherein the electrically resistive layer is the outermost layer or a roller of which volume specific resistance of the resistive layer is from $10^8$ to $10^{12}$ Ωcm is desirable.

The composition of the present invention being capable of imparting an electric conductivity and non-tackifying property comprises (A) a carbon fluoride having a fluorine atom to carbon atom ratio F/C of more than 0.5 and less than 1.0 and (B) at least one selected from the group consisting of a thermoplastic resin, a thermosetting resin and a rubber.

When the F/C of the carbon fluoride of the component (A) is not more than 0.5 (fluorine content of not more than 44.2% by weight ), effect of the fluorination is insufficient, and there remain problems inherent to carbon materials before the fluorination as they are, that is to say, problem such that a rate of change of a resistance by the mixing amount is very large and a control of electric conductivity is difficult, and that due to the developed structure, dispersion of the carbon fluoride becomes nonhomogeneous and the obtained composition becomes hard. When the F/C is not less than 1.0 (fluorine content of not less than 61.4% by weight), an intended electric conductivity cannot be imparted to the composition. The preferable F/C is more than 0.5 and not more than 0.95 (fluorine content of 60% by weight), particularly more than 0.5 and not more than 0.9 (fluorine content of 58.8% by weight).

In the present invention, the fluorine content is measured in the following manner. The carbon fluoride is packed together with a combustion improver $Na_2O_2$ and polyethylene film and is burned in a sealed flask filled with oxygen. The produced hydrogen fluoride is measured with a fluoride ion specific electrode ion meter (Ion Analyzer 901 of Orion Corp.) by a usual method. The fluorine content is calculated from the obtained value. By using the obtained fluorine content, the F/C is caluculated.

Such a carbon fluoride (A) comprises a poly(carbon monofluoride) as a main component, and preferable is one obtained by fluorinating a carbon material having an average particle size of not more than 1 μm, preferably not more than 0.1 μm with a fluorine gas. In the carbon fluoride to be obtained from carbon materials having an average particle size exceeding 1 μm, for example, petroleum cokes, graphite powder, carbon fiber and the like, its mount have to be increased to impart electric conductivity and non-tackifying property to a resin or a rubber, and there is a tendency that there occur disadvantages such as increased surface roughness, deterioration of mechanical strength, uneven resistivity, and the like of the obtained composition.

The carbon material suitable for the carbon fluoride (A) is a carbon black having the above-mentioned average particle size. As the carbon black, there are used ones commercially available, for example, furnace black for rubbers ( for example, Asahi #55 and the like made by Asahi Carbon Kabushiki Kaisha), channel black for color (for example, Leben 7000 made by Columbia Carbon Co., Ltd. ), thermal black (Sevacarbo MT-C1 made by Columbia Carbon Co., Ltd.) and the like.

Among the carbon blacks, ones particularly generally called an electrically conductive carbon black are preferable. The electrically conductive carbon black is defined using such factors that an average particle size is small (average particle size not more than 0.1 μm), a surface area is large ($N_2$ surface area not less than 50 $m^2/g$), a structure is progressed (oil absorption amount not less than 100 cc/g), impurities content is small (ash content less than 0.1%) and forming into graphite is advanced. Because the electrically conductive carbon black can impart electric conductivity to materials in a relatively small mixing amount, it is used widely. Example thereof are ones commercially available, for instance, Ketchen Black EC and Ketchen Black EC-600JD (available from Ketchen Black International Kabushiki Kaihsa), Black Purples 2000, Vulcan XC-72 and CSX-99 (available from Cablack Kabushiki Kaisha), Denka Black (available from Denki Kagaku Kogyo Kabushiki Kaisha), Conductex 950 (available from Columbia Carbon Kabushiki Kaisha) and the like.

The carbon fluorides (A) to be used in the present invention are obtained by bringing the mentioned carbon materials into contact with a fluorine gas at a temperature ranging from 200° to 600° C., more preferably from 300° to 500° C. At a reaction temperature lower than this range, there occur problems that the fluorination reaction advances slowly, the fluorination degree is difficult to increase, thermal stability is not sufficient and properties inherent to carbon fluorides such as non-tackifying property and lubricity are not exhibited. Reversely when the reaction temeperature is higher than this range, thermal decomposition reaction is easy to occur and a yield of the obtained carbon fluorides lowers. Also there are some cases where sudden and sharp thermal cracking reaction occurs resulting in an explosion. Therefore it is necessary to fully pay attention to it.

The fluorine gas to be used for the reaction may be diluted with inert gases such as nitrogen, argon, helium and tetrafluorocarbon and may contain hydrogen fluoride. Also the reaction can be carried out at normal pressure, and there is no problem if the reaction is conducted under reduced pressure or under pressure.

Besides the above-mentioned conditions, the reaction time, fluorine gas flow and the like may be properly adjusted depending on reactivity of the carbon materials as raw materials with the fluorine gas and the desired F/C (fluorine content).

As the resin or rubber for the component (B), there are thermoplastic resins, thermosetting or rubbers.

The thermoplastic resins can be used advantageously as the materials being high in processability since they can be plastically deformable by heating after once formed into a molded article. For example, there is a fluorine-containing resin, polyamide, polyamideimide, polyacetal or the like.

Examples of the fluorine-containing resins are polytetrafluoroethylene; copolymers of tetrafluoroetylene with at least one of other copolymerizable ethylenically unsaturated monomer (for example, olefins such as ethylene and propylene, halogenated olefins such as hexafluoropropylene, vinylidene fluoride, chlorotrifluoroethylene and vinyl fluoride, and perfluoroalkyl vinyl ethers); polychloro-trifluoroethylene; polyvinylidene flouride; and the like. Particularly preferable flourine-contining resins are polytetrafluoroethylene, copolymers of tetrafluoroethylene with at least one of hexafluoropropylene, perfluoro(methyl vinyl ether), perfluoro(ethyl vinyl ether) and perfluoro(propyl vinyl ether) (containing generally in an amount of not more than 40% by mole with respect to tetrafluoroethylene), and the like. When the fluorine-containing resin is used, there is exhibited an effect such that a composition having an excellent heat resistance, non-tackifying property, water-and oil-repelling property, lubricity and chemical resistance as compared with resins for general uses can be obtained.

As the polyamides, there can be used various materials commercially available as nylon resins. For example, there are 6 nylon, 66 nylon, 610 nylon, 612 nylon, 11 nylon, 12 nylon, 46 nylon and the like. Also aramide wherein an aromatic component is introduced in a main chain, is encompassed therein. As the aramide, there are poly(paraphenylene terephthalamine) and the like. These, though relatively inexpensive, exhibit effects such as an excellent heat resistance, high mechanical strength and excellent lubricity.

As the polyamideimide, there is, for example, Toron (available from Mitsubishi Kasei Kogyo Kabushiki Kaisha) obtained by the reaction of trimellitic anhydride and aromatic diamine, and the like, which exhibits effects such as a very high mechanical strength and heat resistance.

When the thermosetting resins are used, since they have a three-dimensional structure after being cured, they can allow properties such as heat resistance, weatherability and chemical resistance and can be used advantageously mainly as the paint composition. For example, there are silicone resins, phenol resins and the like.

As the silicone resins, there can be, for example, polymers generally called the silicone resins having a three-dimensional network structure and being obtained by hydrolyzing organosilane. As the commercially available ones, there are, for example, SR 2400 (available from Toray Dow Corning Silicone Kabushiki Kaisha) and the like. Also there are ones being copolymerized with another organic resin generally called the silicone modified resin. There are silicone alkyd resin, silicone polyester resin, silicone epoxy resin and the like, depending on the kinds of organic resins to be copolymerized. As the commercially available resins, there are, for example, SR2100, SR2108, SR2115 (all available from Toray Dow Corning Silicone Kabushiki Kaisha) and the like which exhibit effect that low temperature curing is possible at relatively low cost.

When the rubbers are used, because of elasticity of them, the composition can be endowed with property to be deformed by a small stress and restored to the original state, and can be used advantageously as the materials for sealants, adhesives and rollers. Examples of the rubbers are ones for general uses, such as a silicone rubber or a fluorine-containing rubber, a styrene-butadiene rubber, a polyurethane rubber, a nitrile rubber, a chloroprene rubber, EPDM or the like.

As the silicone rubbers, there are various materials commercially available for sealants, coatings, formation of die and the like.

The silicone rubbers are generally classified into various grades, depending on their states and curing mechanisms, and are roughly classified into Mirable type silicone rubber and liquid form silicone rubber. The Mirable type silicone rubber is of a type heat-curing by adding a vulcanizing agent during the use, and is molded and processed in the same manner as in general organic rubbers. The Mirable type silicone rubbers are used as materials for key pats of desk-top calculators and the like and also rollers for an electrostatic copying machine. The liquid form silicone rubbers are in the form of a liquid having low density and requires no specific curing device. They are cured and formed into rubbers at room temperature or by heating, and are featured by excellent workability. There are two types of liquid form silicone rubbers, one component type and two component type, and as the curing types, they are classified into a condensation type and an addition type. The liquid form silicone rubbers are widely used as adhesives, sealants, coatings, potting agents and the like.

Both the Mirable type and liquid form silicone rubbers exhibit effects such as excellent electrical property as well as excellent heat resistance and cold resistance, good compression restoration property, chemical resistance, oil resistance and weatherability in a wide temperature range.

The fluorine-containing rubber is a highly fluorinated elastic copolymer, and particularly preferable fluorine-containing rubbers are elastic copolymers of generally 40 to 85% by mole of vinylidene fluoride with at least one of other copolymerizable fluorine-containing ethylenically unsaturated monomers. The fluorine-containing rubber which contains iodide in the polymer chain also is, for instance, a fluorine-containing rubber which maininly comprises an elastic copolymer of the same % by mole as mentioned above of vinylidene fluoride with at least one of other copolymerizable fluorine-containing ethylenically unsaturated monomers, said copolymer being containing 0.001 to 10% by weight, preferably 0.01 to 5% by weight of iodide at its polymer end (JP-A-40543/1977). Typical examples of the other ethylenically unsaturated monomers which are copolymerized with vinylidene fluoride to provide the elastic copolymers are hexafluoropropylene, pentafluoropropylene, trifluoroethylene, trifluorochloroethylene, tetrafluoroethylene, vinyl fluoride, perfluoro(methyl vinyl ether), perfluoro(ethyl vinyl ether), perfluoro(propyl vinyl ether), and the like. Particularly preferable fluorine-containing rubbers are vinylidene fluoride/hexafluoropropylene elastic copolymer and vinylidene fluoride/tetrafluoroetylene/hexafluoropropylene elastic copolymer. The use of the fluorine-containing rubbers gives effects such as excellent heat resistance and chemical resistance.

When the above-mentioned rubbers for general purposes are used, heat resistance, chemical resistance and the like are poor as compared with the fluorine-containing rubbers, but a flexibility is easy to obtain and cost is low.

The mixing ratio of the components (A) to (B) is 1/99 to 30/70 (weight ratio, hereinafter the same), preferably 5/95 to 20/80, particularly preferably 5/95 to 15/85. If the mixing amount of the component (A) becomes small, sufficient effect of adding the carbon fluorides is not obtained, and if it becomes too much, mechanical strength such as tensile strength tends to lower.

Additives to be usually used may be added to the composition of the present invention if necessary. As such additives, there are, for example, a vulcanizing agent, vulcanization accelerator, vulcanizing auxiliary, inorganic filler, releasing agent and the like. The mixing amount of the additives is not more than 20 parts by weight, preferably not more than 15 parts by weight based on 100 parts by weight of the component (B). Also in order to enhance abrasion resistance, low molecular weight polytetrafluoroethylene can be added in an amount up to 20 parts by weight.

The composition of the present invention is mixed and prepared by the usual method such as the follwoing method.
(1) In case where the component (B) is a resin,
A resin, carbon fluoride and, if necessary, various additives are mixed in a mixer such as a V type blender, tumbler and Henshel mixer and further mixed in a melt kneader such as a double screw extruder to be formed into pellets. The thus obtained pellets are made into the desired form of moldings, for example, plate, film and the like by the use of a molding machine being usually used for molding a thermoplastic resin, for example, an injection molding machine, compression molding machine, extrusion molding machine and the like.

(2) In case where the component (B) is a rubber,

A carbon fluoride and, if necessary, various additives are added to a rubber composition for vulcanization in the form of a solid, and mixed by the use of, for example, a banbury mixer or a rubber roll to form into a homogeneous rubber composition for the vulcanization. Also as another mixing method of these additives, there is a method to pre-mix them with the rubber by a usual open roll and kneader and then mix with other components.

The composition of the present invention which is capable of imparting electric conductivity and non-tackifying property can be applied for uses such as paint compositions, elastomer materials for sealing being suitable for semiconductor production industries, auto parts such as fuel tubes and the like, and further can be used for electrically resistive layers of semi-electrically conductive rollers for electrostatic copying.

Also in case where fluorine-containing rubbers are sued as the component (B), electrically conductive non-tackifying vulcanized rubbers can be provided. The best mode in this case is explained below.

The carbon fluoride of the component (A) is mixed homogeneously with a fluorine-containing rubber composition for the vulcanization by usual mixing method of a fluorine-containing rubber composition for the vulcanization, for example, with a banbury mixer, rubber roll or the like. Also as another mixing method of these additives, there is a method to pre-mix them with the fluorine-containing rubber by a usual open roll and kneader and then mix with other components.

The thus homogeneously mixed fluorine-containing rubber composition is subjected to the vulcanization and molding as it is, and also can be used as a composition in the form of a liquid being dispersed or dissolved properly in water or organic solvent.

This liquid composition can be used for the purpose of the present invention, being impregnated or coated onto paper, fiber cloth, film, sheet, plate, tube, pipe, container and other molded articles (Materials of them to be used are synthetic resin, rubber ( including a fluorine-rubber), metal, ceramic and the like) to be vulcanized and deposited.

As the organic solvents, there can be used methyl ethyl ketone, acetone, cyclohexanone, amyl acetate, dioxane, tetrahydrofuran alone or in combination of not less than two kinds thereof.

As mentioned above, the fluorine-containing rubber composition of the present invention can be vulcanized under usual conditions in accordance with the known method for vulcanizing a fluorine-containing rubber, and the intended vulcanized rubber having electric conductivity and non-tackifying property is obtained without impairing various properties inherent to rubbers.

The present invention further relates to a paint composition comprising the above-mentioned electrically conductive and non-tackifying compound and a liquid carrier.

The liquid carrier is mixed since it is suitable for various painting works such as spray coating, brush coating and dip coating. Examples thereof are, for instance, lower ketones such as acetone, methyl ethyl ketone and cyclohexanone; lower esters such as ethyl acetate, propyl acetate, and butyl acetate; cyclic ethers such as tetrahydrofuran and 1,4-dioxane; water; a mixture of water with alcohols such as methanol, ethanol and isopropyl alcohol, glycols such as ethylene glycol and water soluble organic liquid such as methyl cellosolve; and not less than two kinds thereof. Particularly preferable liquid carrier is one comprising water as a main component from the viewpoint of painting workability, storage stability, protection of global environment and the like.

The content of the electrically conductive non-tackifying composition in the paint composition of the present invention may be properly selected in consideration of painting workability, film forming property and the like, and is generally 10 to 70% by weight, preferably 30 to 60% by weight.

Further additives which are usually mixed in various paints, may be added depending on uses. As these additives, there are, for example, pigments, adhesion enhancing agents ( organic resin powder and the like), lubricity imparting agents ( fluorine-containing oil and the like), abrasion resistance enhancing agents (inorganic ceramic powder and the like), thickness, film forming agents, surfactants and the like. The mixing mounts of them may be suitably selected depending on uses, coating methods and the like. Attention is to be paid not to impair the intended electric conductivity and non-tackifying property of the present invention.

Then explanation is made on a fluorine-containing rubber paint in case where a fluorine-containing rubber is used as the component (B) of the electrically conductive non-tackifying composition.

The liquid carrier to be used is selected from the abovementioned organic solvents such as lower ketone, lower ester and cyclic ether, water and a mixture of water and water soluble organic liquid. As the water soluble organic liquid, there are alcohols. Among these liquid carriers, water and one comprising water as a main component are most preferable from a point that no painting workability is impaired.

Inorganic fibrous substances as the other substances being contained in the flourine-containing rubber paints are used to enhance compression restoration property of a flurine-containing rubber coating. As the typical substances, there are glass fibers, carbon fibers, asbestos fibers, potassium titanate fibers, and the like. It is desirable that an average length of this inorganic fibrous substance is at least 1 µm, preferably 1 to 100 µm.

Amine compounds to be added, if desired, in the fluorine-containing rubber paint are intended to function mainly as the vulcanizing agent of the fluorine-containing rubber and improve mechanical property together with the above-mentioned coupling agent. Typical examples of such compounds are mono-amines such as ethyl amine, propyl amine, butyl amine, benzyl amine, allylamine, n-amyl amine and ethanolamine, diamines such as ethylenediamine, trimethylenediamine, tetramethylenediamine, hexamethylenediamine and 3,9-bis(3-aminopropyl)-2,4 8,10-tetraoxaspiro[5,5]undecane and polyamines such as diethylenetriamine, triethylenetetramine, tetraethylenepentamine and pentaethylenehexamine. Particularly amine compounds having two or more of terminal amino groups are preferable.

The fluorine-containing rubber paints are made homogeneous by usually mixing an electrically conductive substance, pigment, acid receiving agent, filler and the like ( in addition, surfactant may be used if necessary) with a mixture of a fluorine-containing rubber, fluorine-containing resin and liquid carrier, adding a coupling agent and, if necessary, amine compound (if necessary, the above-mentioned additives such as pigment, acid receiving agent and filler may be added) to the obtained dispersion solution, and them mixing sufficiently by usual method.

The weight ratio of the fluorine-containing rubber to the fluorine-containing resin is desirably 95:5 to 35:65. When the ratio of the fluorine-containing resin is lower than the above-mentioned lower limit, the intended improvement of non-tackifying property and lubricity is not sufficient. On the contrary, when higher than the mentioned upper limit, the intended coating thickness cannot be obtained and cracks and pin holes are easy to occur on the coating.

The adding amount of the carbon fluoride of the component (A) can be changed depending on uses of paints and kinds of electrically conductive substances. The carbon fluoride may be added so that the volume specific resistance of the fluorine-containing rubber coating is not more than $10^8$ Ωcm for the purpose to prevent charging, and not more than $10^2$ Ωcm in case of using as a plate heater.

The coupling agent is usually added in an amount of 1 to 50 parts by weight, preferably 1 to 20 parts by weight based on 100 parts by weight of a fluorine-containing rubber. In case where an amine compound is desired to be added, the amine compound and coupling agent are mixed so that a total amount of them becomes the value mentioned above. In this case, the molar ratio of the coupling agent to the amine compound is selected from the range of 1:99 to 99:1.

As the above-mentioned acid receiving agent, there is used one usually used for the vulcanization of fluorine-containing rubbers in the same manner. For example, one or two or more kinds of bivalent metal oxides or hydroxides are used. Concretely there are oxides or hydroxides of magnesium, calcium, zinc, lead and the like. Also as the above-mentioned filler, there are used silica, day, diatom earth, talc, carbon and the like.

The fluorine-containing paints are coated or impregnated onto the substrate by usual coating methods (brush coating, dipping, spraying and the like), and the intended fluorine-containing rubber coating can be obtained by curing under a temperature condition of room temperature to 400° C., preferably 100° to 400° C. for a suitable period of time.

Coating thickness of the fluorine-containing rubber paints is preferably not less than 5 μm. If the coating thickness is less than 5 μm, there is a fear that uneveness occurs on the whole surface of the substrate and there occurs uncoated part. The thus obtained fluorine-containing rubber coating has electric conductivity in addition to properties inherent to fluorine-containing rubbers such as heat resistance, weatherability, abrasion resistance, oil resistance, solvent resistance and chemical resistance, and is excellent in adhesivity to the substrate and mechanical property of the coating itself and is further endowed with non-tackifying property and lubricity on the coating surface.

The coupling agent is a compound acting on an interface between the organic material and the inorganic material and forming a more rigid bridge between both the materials rather than chemical or physical bonding. The coupling agent is usually a compound of silicon, titanium, zirconium, hafnium, trium, tin, aluminum or magnesium, and a compound having a group being capable of bonding the oraganic and inorganic materials. Among these coupling agents, preferable is silane coupling agent, and ortho-acid esters of transition elements of the group IV of the periodic table (for example, titanium, zirconium and the like) and their derivatives. Particularly an aminosilane compound is most preferable.

As the silane coupling agents, there can be, for example, silane compounds shown by the formula:

$$R^1 \cdot Si \cdot R^2{}_{3-a} \cdot R^3{}_a$$

(wherein, $R^1$ is an alkyl group or a vinyl group having 1 to 10 carbon atoms and at least one kind functional atom or group selected from chlorine atom, amino, aminoalkyl, ureide, glycidoxy, epoxy cyclohexyl, acryloyloxy, methacryloyloxy, mercapto and vinyl, $R^2$ and $R^3$ are respectively an atom or group selected from chlorine atom, hydroxyl, alkoxyl having 1 to 10 carbon atoms, alkoxy-substituted alkoxyl having 2 to 15 carbon atoms, hydroxyalkyloxyl having 2 to 4 carbon atoms and acyloxyl having 2 to 15 carbon atoms, a is 0,1 or 2).

$R^1$ is an alkyl group having a functional substituent, and suitable examples thereof are β-aminoethyl, γ-aminopropyl, N-(β-aminoethyl)-γ-aminopropyl, γ-ureidopropyl, γ-glycidooxypropyl, β-(3,4-epoxycyclohexyl)ethyl, γ-acryloyloxypropyl, γ-methacryloyloxypropyl, γ-mercaptopropyl, β-chloroethyl, γ-chloropropyl, γ-vinylpropyl and the like. Also $R^1$ may be a vinyl group.

Examples of the above-mentioned silane compounds to be suitably used are, for instance, γ-aminopropyltriethoxysilane, N-β-aminoethyl-γ-aminopropyltriethoxysilane, γ-ureidopropyltrietholxysilane, γ-glycidoxypropyltrimethoxysilane β-(3,4-epoxycylohexyl)ethyltrimethylsilane, γ-methacryloxypropyltrimethoxysilane, γ-mercaptopropyltrimethoxysilane, γ-chloropropyltrimethoxysilane, vinyltris (β-methoxyethoxy)silane, vinyltriethoxysilane, vinyltrichlorosilane, vinyltriacetoxysilane, N-(trimethoxysilylpropyl) ethylenediamine, N-β-aminoethyl-γ-aminopropylmethyldimethoxysilane and β-aminoethyl-γ-aminoethyl-γ-aminopropyltrimethoxysilane. Among these silane coupling agents, aminosilane compounds, for example, γ-aminopropyltriethoxysilane, N-β-aminoethyl γ-aminopropyltrimethoxysilane, N-(trimethoxysilylpropyl) ethylenediamine, N-β-aminoethyl-γ-aminopropyl-γ-methyldimethoxysilane, γ-ureidopropyltriethoxysilane, β-aminoethyl-β-aminoethyl-γ-aminopropyltrimethoxysilane and the like are particularly preferable, because they function as the vulcanizing agents for the fluorine-containing rubbers, contribute to enhance adhesivity to the substrate, and further are used safely against the liquid carrier.

As the compounds of titanium, zirconium, hafnium and trium, there can be mentioned, for example, ortho esters shown by the formula:

$$T(OR)_4$$

(wherein, T is titanium, zirconium, hafnium or trium, R shows alkyl, cycloalkyl or allyl) and derivatives to be obtained by reacting them with one or more compounds having at least one functional group. As the above-mentioned compounds having at least one functional group, there can be used polyhydric alcohols such as glycerine, ethylene glycol, 1,3-butanediol, 2,3-butanediol, hexylene glycol and octylene glycol, oxyaldehydes such as salicylaldehyde and glycose, oxyketones such as diacetone alcohol and fructose, oxycarbonic acids such as glycolic acid, lactic acid, dioxy maleic acid and citric acid, diketones such as diacetylacetone, ketones such as acetoacetate, esters of ketonic acids such as acetoacetic ethyl, oxyamines such as triethanolamine and diethanolamine, and oxyphenol compounds such as cathecol and pyrogallol.

Concrete examples of the compounds in case where T is titanium, are tetraalkylti tanate (for example, tetraethyl titanate, tetraisopropyl titanate and tetrabutyl titanate), tetraethyleneglycol titanate, triethanolamine titanate, titanium acetylacetonate, isopropyltrioctanoyl titanate, isopropyl trimethacryl titanate, isopropyltriacryl titanate, isopropyltri(butyl, methylpyrophosphate) titanate, tetraisopropyldi (dilaurylphosphire) titanate, dimethacryloxy acetate titanate, di(dioctylphosphate) ethylene titanate and the like.

As the zirconium compounds, there can be used the same compounds as the above-mentioned titanium compounds. Examples thereof are tetraalkyl zirconate such as tetraethyl zirconate and tetrabutyl zirconate, n-propyl zirconate, isopropyl zirconate, n-butyl zirconate, isobutyl zirconate, zirconium acetylacetonate and the like.

As the compounds of hafnium and trium, there can be used the same compounds as the titanium and zirconium compounds.

As the tin compounds, there can be used organic or inorganic compounds, for example, $SnCl_4$ and the like. As the aluminum compounds, there can be mentioned aluminum isopropylate, monosec-butoxyaluminum diisopropylate, aluminumsec-butylate, ethylacetoacetate aluminum diisopropylate, aluminumtris (ethylacetoacetate) and the like.

As the magnesium compounds, there can be mentioned magnesium alcoholates such as magnesium methylate and magnesium ethylate.

The electric conductivity of the above-mentioned fluorine containing rubber paint has a feature that the resistivity can be easily controlled to be a desired value by selecting the kind of the carbon fluoride to be mixed, fluorine content and mixing amount.

Also this fluorine-containing rubber paint has a feature that by its excellent dispersibility as the paint and a little increase in paint viscosity, coating is easy and as a result, a coating having uniform property can be obtained.

The fluorine-containing rubber paint of the present invention can be used for various uses requiring a non-tackifying and electrically conductive coating, for example, electrical parts such as electrically conductive packing, pin hole tester detecting element, measuring electrode, and those for prevention of high frequency interference, alternative for solder, printing circuit board, condenser, fixed or variable resistor, measuring electrodes such as piezoelectric and photoelectric elements, seal for electronic devices, prevention of charging of powder mill, factories generating dusts, operation room and belt for belt conveyer, prevention of charging of sub-heater for thermostat, resistance wire, spot welder, non-electrically conductive plating and rubber-or resin-made various rolls, plate heater and the like. This paint is particularly suitable of semi-electrically conductive rollers of electrostatic copying machine, and concretely can be used for the production of a charging roller, transferring roller, developing roller and fixing roller (soft type), press roller (backup roller), paper feed roller and the like.

The fluorine-containing rubber paint is as referred to hereinabove, and also can be produced in the same manner when other resins or rubbers are used as the component (B).

Mentioned below are descriptions relating to only characteristic matters of each resin and rubber. Other technical matters and conditions are substantially the same as those of the fluorine-containing rubber paint, and it is possible to make a design change obvious to a person skilled in the art.

Explained below is the case where a fluorine-containing resin is used as the component (B).

Examples of the fluorine-containing resins are polytetrafluoroethylene; copolymers of tetrafluoroetylene with at least one of other copolymerizable ethylenically unsaturated monomer (for example, olefins such as ethylene and propylene, halogenated olefins such as hexafluoropropylene, vinylidene fluoride, chlorotrifluoroethylene and vinyl fluoride, and perfluoroalkyl vinyl ethers); polychloro-trifluoroethylene; polyvinylidene flouride; and the like. Particularly preferable flourine-containing resins are polytetrafluoroethylene, copolymers of tetrafluoroethylene with at least one of hexafluoropropylene, perfluoro( methyl vinyl ether), perfluoro( ethyl vinyl ether) and perfluoro(propyl vinyl ether) (containing generally in an amount of not more than 40% by mole with respect to tetrafluoroethylene), and the like.

The liquid carrier is mixed since it is suitable for various painting works such as spray coating, brush coating and dip coating. Examples thereof are, for instance, lower ketones such as acetone, methyl ethyl ketone and cyclohexanone; lower esters such as ethyl acetate, propyl acetate, and butyl acetate; cyclic ethers such as tetrahydrofuran and 1,4-dioxane; water; a mixture of water with alcohols such as methanol, ethanol and isopropyl alcohol, glycols such as ethylene glycol and water soluble organic liquid such as methyl cellosolve; and not less than two kinds thereof. Particularly preferable liquid carrier is one comprising water as a main component from the viewpoint of painting workability, storage stability, protection of global environment and the like.

In addition, surfactants, pigments, fillers and various painting additives can be added if necessary.

Further additives which are usually mixed in various paints, may be added depending on uses. As these additives, there are, for example, pigments, adhesion enhancing agents (organic resin powder and the like), lubricity imparting agents ( fluorine-containing oil and the like), abrasion resistance enhancing agents (inorganic ceramic powder and the like), thickness, film forming agents, surfactants and the like. The mixing amounts of them may be suitably selected depeniding on uses, coating methods and the like. Attention is to be paid not to impair the intended electric conductivity and non-tackifying property of the present invention.

The adding amount of the carbon fluoride of the component (A) can be changed depending on uses of paints, a kind of the carbon fluoride and the degree of the fluorination. The carbon fluoride may be added so that the volume specific resistance is not more than $10^8$ $\Omega$cm for the purpose to prevent electric charging.

The fluorine-containing resin paint of the present invention can be used for paints for a fixing roll (hard type) of an electrostatic copying machine, coating for prevention of electric charging of resin-made parts, non-tackifying (stainproof) coating of metals, coating for non-lubricant processing of metals (lubricated steel plate) and the like.

In case where polyamides are used as the component (B), paints can be prepared in the same manner as in the above-mentioned fluorine-containing resin. Also it is possible to previously combine the carbon fluoride of the component (A) with fine particles of polyamide by a dry method to give composite fine particle materials and then disperse them in the liquid carrier by a proper method. As the polyamide fine particles to be used in this case, there can be mentioned fine particles of a spherical form, for example, SP-500 (available from Toray Kabushiki Kaisha). For the combining method, for example, Hybridizer (available from Kabushiki Kaisha Nara Kikai Seisakusho), Mechanomill (available from Okada Seiko Kabushiki Kaisha) and the like can be used. The feature of this method is such that since composite fine particle materials are previously prepared, they are mixed homogeneously, and a uniform coating is easily obtained irrespective of paints being in a dispersed state.

As the uses, this paint is suitable for fields wherein mechanical strength and abrasion resistance are required though heat resistance, chemical resistance and non-tackifying property may be inferior as compared with fluorine-containing resin paints. For example, it is possible to use for coating of semi-electrically conductive rollers of an electrostatic copying machine, coating for non-lubricant processing of metals, coating for preventing electric charging of various resin-made parts and the like.

Also in case where polyamideimides are used as the component (B), in the same manner as in case of the above-mentioned fluorine-containing resins and polyamides, the polyamideimides not only are used alone, but also are mixed with flourine-containing resins for use as a primer paint for a fluorine-containing resin paint or are mixed with thermoplastic resins such as polyamides to improve mechanical property.

In case where silicone resins or silicone rubbers are used as the component (B), an organic solvent mainly such as toluene or silicone oil having a low boiling point is used as the liquid carrier. The carbon fluoride as the component (A) is added together with a catalyst (for example, zinc octylate) and various additives to a commercially available composition for curing (for example, SR-2400, available from Toray Dow Corning International Kabushiki Kaisha), and fully dispersed in triple rolls and the like. The solvent such as toluene is added to give a paint having a viscosity conforming to a coating method. After the painting, the paint is cured at a specified temperature ( for example, 235° C., for 1 hour).

With regard to rubbers for general uses, the mixing can be carried out in compliance with properties of each rubber in the same manner as in the above-mentioned fluorine-containing rubber and silicone rubber.

The present invention also further relates to an electrically conductive non-tackifying roller comprising an electrically conductive elastic layer having a volume specific resistance of not more than $10^5$ Ωcm and an electrically resistive layer having a volume specific resistance ranging from $10^6$ to $10^{12}$ Ωcm, preferably from $10^8$ to $10^{12}$ Ωcm, both of which are formed at least in that order on an electrically conductive supporting body, and the electrically resistive layer comprises the above-mentioned electrically conductive non-tackifying compositions.

Also, for the simplification of the machine, the electrically resistive layer can be formed directly to the above-mentioned electrically conductive supporting body such as a metal core roll without forming the electrically conductive elastic layer on the supporting body. In this case, it is preferable to make the resistive layer thickness thick enough and make the layer to have a rubber elasticity. In case of a fixing process, if an elastic layer is used on the press roller, the fixing roller comprising only an electrically resistive layer free of elasticity can also be used.

Such a roller is particularly useful semi-electrically conductive roller such as the charging roller, fixing roller and developing roller of the electrostatic copying machine.

In the roller to be used in the present invention, the electrically conductive elastic layer is first formed on the electrically conductive supporting body. Materials of this electrically conductive elastic layer is not particularly limited, and this layer comprises a composition prepared by mixing electrically conductive powder and fiber (carbon black, metal powder, carbon fiber and the like) in a synthetic rubber such as silicone rubber, ethylene propylene rubber, epichlorohydrine rubber, nitrile rubber and urethane rubber. This layer has a volume specific resistance of not more than $10^5$ Ωcm, preferably not more than $10^3$ Ωcm and a rubber hardness (JIS A) in the range of 20 to 50 degrees, preferably 25 to 40 degrees. It is not preferable to use a plasticizer and surfactant for the purposes of adjusting a resistance and a rubber hardness when mixing the electrically conductive powder and the like. This is because these chemicals bleed out with the lapse of time, resulting in the contamination of the surface of the photoreceptor and the occurrence of toner filming on the surface of the roller.

The materials of the electrically conductive supporting body are not particularly limited, and aluminum or an alloy comprising aluminum as a main component or stainless steel can be used.

Then the method for producing the roller of the present invention is explained below. (i) At first, as the material for the electrically conductive elastic layer, for instance, a peroxide vulcanizing agent is added to a rubber compound prepared by dispersing a carbon black in a heat-vulcanizing silicone rubber, and then kneaded sufficiently with twin rollers to obtain a carbon black-dispersed rubber compound having a homogeneous composition. (ii) This rubber compound is wound on an outer circumference of a metal core roll, and put in a die for molding the roller which has been preheated (for instance, 170° C.). Then a specified pressure (for instance, 120 kg/cm$^2$) is applied to carry out a first vulcanization (for instance, for 10 minutes). (iii) Then the pressure applied to the die is relieved, and the roller is taken out to carry out a second vulcanization (for instance, 200° C., for 4 hours). (iv) After that, the surface of the roller is polished, and the outside dimensions are obtained and at the same time, the surface roughness is made to be not more than 10 μm (Rz). (v) Afterwards the above-mentioned electrically conductive non-tackifying composition as the material for the electrically resistive layer is coated on the outer circumference of the electrically conductive elastic layer obtained in (iv) with air spray (or dipping method) (coating thickness 30 to 200 μm), and sintering is conducted under the specified conditions (for instance, 300° C., for 20 minutes). As the sintering method, in order to minimize heat deterioration of the electrically conductive elastic layer, it is desirable to properly use an infrared image oven.

In case where the roller of the present invention is used as the semi-electrically conductive roller of the electrostatic copying machine, it is preferable to use a fluorine-containing polymer such as a fluorine-containing resin or fluorine-containing rubber in the component (B) of the electrically conductive non-tackifying composition because of excellent non-tackifying property and heat resistance against the toners, durability and the like.

For example, in case where the electrically resistive layer is formed by adding and dispersing the carbon fluoride (A) in the fluorine-containing polymer (B), electric conductivity can be controlled by the carbon fluoride, and also an electric breakdown is hard to occur because of an enhanced dispersibility and the deterioration of non-tackifying property against the toners is solved. Further it is a surprise that abrasion resistance is enhanced as compared with a fluorine-containing polymer alone, and sufficient property as the semi-electrically conductive roller can be exhibited.

Also when the thermoplastic resins such as polyamide and polyamideimide, thermosetting resins such as a silicone resin, silicone rubbers and rubbers for general uses are used as the component (B) besides the fluorine-containing polymers, they are useful as the electrically resistive layer of the semi-electrically conductive roller because non-tackifying property and lubricity of the carbon fluoride function additionally. However among these resins, there are ones having heat resistance and the like being inferior as compared with the fluorine-containing polymer, and therefore for the semi-electrically conductive rollers produced using these resins, considerations are required for the operating conditions and the position where the rollers are used.

The rollers of the present invention are excellent in non-tackifying property against the toners, can prevent the toner filming and can exhibit a stable function as the roller for a long period of time.

The rollers of the present invention can be used on a facsimile, laser printer and the like besides the electrostatic copying machine.

The present invention is more specifically explained by means of Examples. Parts mean parts by weight.

EXAMPLE 1

After the mixture of the following components as the electrically conductive elastic layer was kneaded to give a rubber compound having a homogeneous composition, the compound was subjected to a first vulcanization with a die molding (170° C., 10 minutes, 120 kg/cm$^2$), and then subjected to a second vulcanization (200° C., 4 hours).

| | |
|---|---|
| Heat-vulcanizable silicone rubber (DY32-931U: TORAY DOW CORNING SILICONE) | 100 parts |
| Heat-vulcanizable silicone rubber (SRX-557: TORAY DOW CORNING SILICONE) | 100 parts |
| Vulcanizing agent (RC-4: TORAY DOW CORNING SILICONE) | 6 parts |

The vulcanized article was finished by surface-polishing so as to be a surface roughness of 4 μm (Rz) and an outer diameter of 12 mmϕ, and a roller having an electrically conductive elastic layer with a volume specific resistance of 3×10$^3$ Ωcm on an electrically conductive core roll was prepared.

To the resulting electrically conductive elastic roller an electrically conductive non-tackifying composition having the following components was applied by air spray method, and then cured at 380° C. for 30 minutes to obtain a coating having a thickness of 30 μm.

| | |
|---|---|
| Fluorine-containing paint (AD-1CR: DAIKIN INDUSTRIES, LTD., solid content 50%) | 120 parts |
| Surfactant (HS-208: NIPPON OIL & FATS CO., LTD.) | 10 parts |
| Carbon fluoride (Starting material: Katzen Black EC (KETZEN BLACK INTERNATIONAL CO., LTD.), F/C: 0.95 (fluorine content: 60% by weight)) | 3 parts |
| Water | 20 parts |

Figure 2:
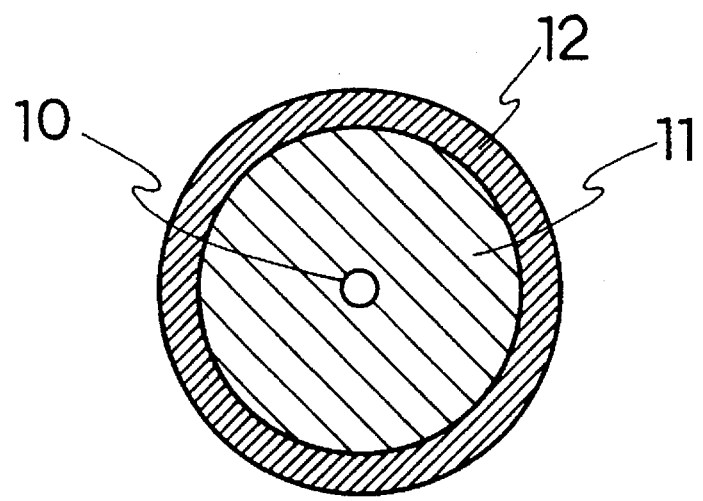
FIG. 2 is an outline cross-sectional view showing a layer configuration of the semi-electrically conductive roller of the present invention.

As described above, the desired semi-electrically conductive roller of FIG. 2 having a rubber hardness of 35 degree (JIS A) of the present invention was obtained.

EXAMPLE 2

A semi-electrically conductive roller was prepared in the same manner as in EXAMPLE 1 except that a carbon fluoride (F/C=0.55) having a fluorine-content of 47% by weight was used.

Comparative Example 1

A roller was prepared in the same manner as in EXAMPLE 1 except that a carbon black which was not fluorinated was used instead of the carbon fluoride.

Comparative Example 2

A roller was prepared in the same manner as in EXAMPLE 1 except that a carbon black which was completely fluorinated (i.e. F/C=1.1 (fluorine content 63%)) was used instead of the carbon fluoride.

Comparative Example 3

The carbon fluoride of EXAMPLE 1 and the carbon black of COMPARATIVE EXAMPLE 1 were mixed in a ratio of 4:1 (weight) to obtain a powder having an average F/C of 0.58 (fluorine content 48%).

The procedures of EXAMPLE 1 were repeated by using the powder to prepare a semi-electrically conductive roller.

Comparative Example 4

The semi-electrically conductive roller prepared as above was incorporated as a charging roller in the electrostatic copying machine shown in FIG. 1. The toner filming property with time lapsing and the electrical properties, i.e. volume specific resistance and breakdown voltage were evaluated. The results are shown in Table 1.

The evaluation and measurement are as follows:

(1) Resistance to toner filming (ranking): Adhesion condition of toner on the surface of charging roller was observed after operating the machine of FIG. 1 for 100 hours and 300 hours. Evaluation is conducted on the basis of the following ranks. RANK ①... Toner on the roller surface can be easily wiped with a cloth. RANK ②... A slight toner remains after the wiping. RANK ③... Cannot be wiped completely to leave a thin toner layer. RANK ④... Toner is sticked strongly to the roller surface.

(2) Volume specific resistance (electrically resistive monolayer): A thin aluminum plate (thickness 0.5 mm) is coated with an electrically resistive material by dipping method so as to be a thickness of 50 μm to prepare a sample. After the sample is stayed for 16 hours in an atmosphere of 20° C. and 60% relative humidity, a volume specific resistance is measured by using a cell for measuring resistance (Resistivity Chamber R12702A: Kabushiki Kaisha Advantest) and an ohm-meter (Digital Super High Ohm-meter R8340A: Kabushiki Kaisha Advantest). An electrical resistance of the roller is measured, after staying the sample for 16 hours in an atmosphere of 20° C. and 60% relative humidity, by using a copper tape of 10 mm width (Scotch Tape No. 1245: SUMITOMO THREE M Co., Ltd.) as an electrode, and an ohm-meter (Digital Super High Ohm-meter R8340A: Kabushiki Kaisha Advantest) where a distance between a main electrode and a guard electrode is 1 mm.

(3) Breakdown voltage: After staying a roller of sample for 16 hours in an atmosphere of 20° C. and 60% relative humidity, a direct voltage which is applied between a main electrode of 10 mm width and a core roller is increased gradually, a lowest voltage at which breakdown is caused is measured.

As is clear from Table 1, in comparison with the rollers of the COMPARATIVE EXAMPLES the roller of the present invention is excellent in resistance to toner filming, and can be used as a good charging roller.

TABLE 1

| | Ex. 1 | Ex. 2 | Com. Ex. 1 | Com. Ex. 2 | Com. Ex. 3 |
|---|---|---|---|---|---|
| Resistive Materials | | | | | |
| Added materials | Carbon fluoride (F/C = 0.95) | Carbon fluoride (F/C = 0.55) | Non-fluorinated carbon black (F/C = 0) | Completely-fluorinated carbon black (F/C = 1.1) | Mixture of Ex. 1 and Com. Ex. 1 at 4:1 (weight) (Av. F/C = 0.58) |
| Volume specific resistance ($\Omega$ cm) Semi-electrically conductive roller | $2.8 \times 10^{11}$ | $3.8 \times 10^8$ | $2.6 \times 10^3$ | $4.7 \times 10^{13}$ | $7.2 \times 10^5$ |
| Resistance to toner filming | | | | | |
| 100 hours | ① | ① | ③ | — | ③ |
| 300 hours | ① | ② | ④ | — | ④ |
| Volume specific resistance ($\Omega$ cm) | $7 \times 10^{11}$ | $2 \times 10^6$ | $6 \times 10^5$ | $>10^{14}$ | $5 \times 10^7$ |
| Breakdown voltage (kV) | >3 | 2.8 | 2.3 | >3 | 2.4 |
| Total evaluation | Good | Good | Too low resistance and easily breakdown. | No good because electrically insulative. | Low performance, even though average fluorination is about the same as Ex. 2 |

The completely fluorinated coarbon black could not be used as a semi-electrically conductive roller, because it is electrically insulative (COMPARATIVE EXAMPLE 2). When using the non-fluorinated carbon black as a semi-electrically conductive roller (COMPARATIVE EXAMPLE 1), it is necessary to reduce an amount of carbon black because of its lower electrical resistance. In such a case, since an electrical resistance drastically changes with an amount of carbon black and also a dispersibility of carbon black to a fluorine-containing polymer is bad, the obtained roller is easy to cause breakdown. Further, since a surface roughness of the coating becomes large and a surface hardness becomes low, the roller is bad in abrasion resistance, which results in short life.

On the other hand, when mixing the non-fluorinated carbon black and the carbon fluoride as in COMPARATIVE EXAMPLE 3, though the average fluorination degree is near the degree of EXAMPLE 2, the electrical resistance is lower than that in EXAMPLE 2. Further properties such as resistance to toner filming and breakdown voltage are not improved. The reason is assumed that since the electrical conductivity is obtained mainly from the non-fluorinated carbon black, this case is similar to the case where an amount of the non-fluorinated carbon black is reduced as in COMPARATIVE EXAMPLE 1.

INDUSTRIAL APPLICABILITY

According to the composition of the present invention, various resins and rubbers can be endowed with electrical conductivity and non-tackiness.

Also, according to the paint composition of the present invention, an electrically conductive and non-takifying coating can be formed on a surface of various molded articles or various substrates.

The semi-electrically conductive roller of the present invention is the semi-electrically conductive roller manufactured by forming the electrically conductive elastic layer and the electrically resistive layer on the electrically conductive supporting body in that order. Since the fluorine-containing polymer which contains the fluorinated carbon black is used as the resistive layer, the following effects are obtained. That is, the toner filming is difficult to happen, because the non-tackiness to toner is excellent and the fluorinated carbon black is well compatible with the fluorine-containing polymer. In addition, because the breakdown is difficult to happen, a beautiful image without black lines can be obtained, and further the degradation of roller and the failure of high voltage generator seldom happen. From these effects, sufficient performances can be exhibited for the semi-electrically conductive roller such as a charging roller.

We claim:

1. A composition consisting essentially of (A) carbon fluoride particles having a ratio F/C of fluorine atom to carbon atom of more than 0.5 and less than 1.0, and (B) at least one resin material selected from the group consisting of a thermoplastic resin, a thermosetting resin and a rubber; wherein the weight ratio of (A) to (B) is from 1/99 to 30/70, and said composition imparts electrical conductivity and non-tackifying property.

2. The composition of claim 1, wherein the F/C is more than 0.5 and not more than 0.95.

3. The composition of claim 1, wherein the F/C is more than 0.5 and not more than 0.9.

4. The composition of claim 1, wherein the component (A) is prepared by fluorinating a carbon black with fluorine gas.

5. The composition of claim 1, wherein the component (A) is prepared by fluorinating a carbon black with fluorine gas at 200° to 600° C.

6. The composition of claim 4, wherein the carbon black is an electrically conductive carbon black.

7. The composition of claim 1, wherein the thermoplastic resin of the component (B) is a fluorine-containing resin, a polyamide or a polyamideimide.

8. The composition of claim 1, wherein the thermosetting resin of the component (B) is a silicone resin.

9. The composition of claim 1, wherein the rubber of the component (B) is a silicone rubber or a fluorine-containing rubber.

10. The composition of claim 1, wherein the rubber of the component (B) is selected from the group consisting of styrene-butadiene rubber, polyurethane rubber, nitrile rubber, chloroprene rubber and EPDM.

11. A paint composition comprising the composition of claim 1 and liquid carrier.

12. An electrically conductive and non-tackifying property roller, manufactured by forming an electrically conductive elastic layer having a volume specific resistance of not more than $10^5$ Ωcm and an electrically resistive layer having a volume specific resistance of $10^6$ to $10^{12}$ Ωcm on an electrically conductive supporting body at least in that order, said electrically resistive layer being prepared by the composition of claim 1.

13. The roller of claim 12, wherein the electrically resistive layer constitutes the outermost layer.

14. The roller of claim 12, wherein the volume specific resistance of the electrically resistive layer is $10^8$ to $10^{12}$ Ωcm.

15. The composition of claim 2, wherein the component (A) is prepared by fluorinating a carbon black with fluorine gas.

16. The composition of claim 3, wherein the component (A) is prepared by fluorinating a carbon flack with fluorine gas.

17. The composition of claim 2, wherein the component (A) is prepared by fluorinating a carbon black with fluorine gas at 200° to 600° C.

18. The composition of claim 3, wherein the component (A) is prepared by fluorinating a carbon black with fluorine gas at 200° to 600° C.

19. The composition of claim 5, wherein the carbon black is an electrically conductive carbon black.

20. The composition of claim 1, wherein the carbon fluoride particles have a fluorine content greater than 44.2 wt % and less than 61.4 wt %, and a balance of carbon.

* * * * *